(12) United States Patent
Haynes et al.

(10) Patent No.: US 8,220,584 B2
(45) Date of Patent: Jul. 17, 2012

(54) HYBRID LEVEL MEASUREMENT SYSTEM

(75) Inventors: Kevin M. Haynes, Lombard, IL (US); Christopher P. Turcotte, Brookfield, IL (US)

(73) Assignee: Magnetrol International, Incorporated, Downers Grove, IL (US)

( * ) Notice: Subject to any disclaimer, the term of this patent is extended or adjusted under 35 U.S.C. 154(b) by 485 days.

(21) Appl. No.: 12/454,435

(22) Filed: May 18, 2009

(65) Prior Publication Data

US 2010/0288578 A1 Nov. 18, 2010

(51) Int. Cl.
*G01S 15/00* (2006.01)

(52) U.S. Cl. ............ 181/123; 181/124; 367/87; 367/99; 73/290 R (58) Field of Classification Search ................ 73/290 V; 367/98, 99; 181/124
See application file for complete search history.

(56) References Cited

U.S. PATENT DOCUMENTS

| | | | |
|---|---|---|---|
| 4,021,808 A | 5/1977 | Spratt | |
| 4,972,386 A * | 11/1990 | Lau | 367/99 |
| 5,131,271 A | 7/1992 | Haynes et al. | |
| 5,150,334 A * | 9/1992 | Crosby | 367/98 |
| 6,621,763 B2 * | 9/2003 | Lyon | 367/99 |
| 7,334,470 B1 * | 2/2008 | Bartoli et al. | 73/290 V |
| 7,420,877 B2 * | 9/2008 | Hosseini et al. | 367/99 |

FOREIGN PATENT DOCUMENTS

WO  WO 01/69188  9/2001

* cited by examiner

*Primary Examiner* — Hezron E Williams
*Assistant Examiner* — Hoang Nguyen
(74) *Attorney, Agent, or Firm* — Wood, Phillips, Katz, Clark & Mortimer (57) ABSTRACT

A measurement instrument comprises a sensor circuit comprising a drive circuit for transmitting a pulse signal at a target of interest and a receive circuit receiving reflected echoes of the pulse signal and developing an analog signal representative of the reflected echoes. An analog processing circuit is operatively coupled to the sensor circuit for receiving the analog signal and comprising a gate for selectively transferring the analog signal to a comparator that compares the gated analog signal to a select threshold level to develop a data signal representative of location of the target of interest. A programmed digital processing circuit is operatively coupled to the sensor circuit and the analog processing circuit and comprises a measurement module to control the drive circuit and evaluate the data signal to determine material location. An echo processing module periodically evaluates a digital representation of the analog signal to determine an expected window time and expected amplitude of a reflected echo representing the target of interest and developing a gate control signal to control the gate based on expected window time and developing the select threshold level based on the expected amplitude.

21 Claims, 5 Drawing Sheets

Fig. 5

HYBRID LEVEL MEASUREMENT SYSTEM

CROSS REFERENCE TO RELATED APPLICATIONS

There are no related applications.

FIELD OF THE INVENTION

This invention relates to a process control instrument, and more particularly, to a hybrid level measurement instrument.

BACKGROUND OF THE INVENTION

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to sensed level.

An electrical transmitter must be connected to an electrical power source to operate. One form of such transmitter, known as a four-wire transmitter, includes two terminals for connection to a power source and two terminals for carrying the output signal proportional to the process variable. Where transmitters are remotely located, the requirement for four conductors can be undesirable due to the significant cost of cabling. To avoid this problem, instrument manufacturers have developed devices known as two-wire, or loop powered, transmitters. A two-wire transmitter includes two terminals connected to a remote power source. The transmitter loop current, drawn from the power source, is proportional to the process variable. The typical instrument operates off of a 24-Volt DC source and varies the signal current in the loop between 4 and 20 milliamps DC. Because of these operating requirements, the design of the transmitter in terms of power consumption is critical. For example, when a low level signal of 4 milliamps is transmitted, there is minimal power available to be consumed by the instrument. Therefore, circuits must be designed to operate off of such minimal available power. More recently, designs have been proposed which use wireless technology for transmitting information on the process variable. Such devices may be battery powered. Again, the design of the transmitter in terms of power consumption is critical to avoid premature wearing down of the battery.

Various industrial distance or level sensing devices operate by emitting bursts of energy, usually acoustic or electromagnetic, and measuring the time required for reflected echoes to return from the material surface of interest. The distance is derived from the propagation speed of the energy burst and the elapsed time of the echo travel for the echo returning from the target of interest. Recent instruments of this type use a combination of analog and digital circuits and include a microcontroller. A microcontroller typically consists of a microprocessor, sometimes referred to as a central processing unit, program memory, data memory, and peripheral devices such as analog to digital and digital to analog converters, memory controllers, serial communication ports, timers, etc. As noted above, the supply energy may be very limited. Moreover, in hazardous application environments the sensor supply energy may be very limited, to preclude the possibility of igniting flammable substances.

Signal processing methods that require substantial run time microprocessor activity to accurately perform echo location tasks conflict with the requirement that the device consume minimal amounts of electricity, or result in low measurement update rates. Analog circuit methods for determining echo time of flight can measure efficiently and accurately but can be triggered by transient electrical noise or spurious signals resulting in erroneous measurements.

The present invention is directed to improvements in measurement instruments.

SUMMARY OF THE INVENTION

In accordance with the invention, there is provided a hybrid measurement system that combines digital signal processing and analog hardware signal detection.

Broadly, in accordance with one aspect of the invention, there is disclosed a measurement instrument comprising a sensor circuit comprising a drive circuit for transmitting a pulse signal at a target of interest and a receive circuit receiving reflected echoes of the pulse signal and developing an analog signal representative of the reflected echoes. An analog processing circuit is operatively coupled to the sensor circuit for receiving the analog signal and comprising a gate for selectively transferring the analog signal to a comparator that compares the gated analog signal to a select threshold level to develop a data signal representative of location of the target of interest. A programmed digital processing circuit is operatively coupled to the sensor circuit and the analog processing circuit and comprises a measurement module to control the drive circuit and evaluate the data signal to determine material location. An echo processing module periodically evaluates a digital representation of the analog signal to determine an expected window time and expected amplitude of a reflected echo representing the target of interest and developing a gate control signal to control the gate based on expected window time and developing the select threshold level based on the expected amplitude.

It is a feature of the invention that the sensor circuit comprises an ultrasonic transducer.

It is another feature of the invention that the sensor circuit comprises a piezo-electric crystal.

It is a further feature of the invention that the analog processing circuit comprises an envelope detector rectifying the analog signal transferred to the digital processing circuit.

It is another feature of the invention that the digital processing circuit echo processing module accumulates multiple digital representations of the analog signal as a running average. The echo processing module periodically searches the running average to determine location of echo shapes and periodically evaluates the echo shapes to determine a target echo and selecting the expected window time and the expected amplitude responsive to the target echo.

It is still another feature of the invention that the comparator latches the data signal when the gated analog signal exceeds the select threshold.

There is disclosed in accordance with another aspect of the invention a through air level measurement instrument comprising a sensor including a transducer for transmitting a pulse signal at a target of interest and receiving reflected echoes of the pulse signal and developing an analog signal representative of the reflected echoes. An analog processing circuit is operatively coupled to the sensor for receiving the analog signal and comprises a gate for selectively transferring the analog signal to a comparator that compares the gated analog signal to a select threshold level to develop a level data signal representative of level of the target of interest. A programmed digital processing circuit is operatively coupled to the sensor and the analog processing circuit. A measurement module controls the drive circuit and evaluates the level data signal to determine material level. An echo processing module periodically evaluates a digital representation of the analog signal to determine an expected window time and expected amplitude of a reflected echo representing the target of interest and develops a gate control signal to control the gate based on expected window time and developing the select threshold level based on the expected amplitude.

There is disclosed in accordance with a further aspect of the invention a through air level measurement instrument comprising a sensor including a transducer for transmitting a pulse signal at a target of interest and receiving reflected echoes of the pulse signal and developing an analog signal representative of the reflected echoes. An analog processing circuit is operatively coupled to the sensor for receiving the analog signal and comprising a gate for selectively transferring the analog signal to a comparator responsive to a gate control signal. The comparator compares the gated analog signal to a select threshold level to develop a level data signal representative of level of the target of interest. A programmed processor is operatively coupled to the sensor and the analog processing circuit to receive the analog signal and the level data signal and to develop the gate control signal and the select threshold level signal. The processor comprises a measurement module to control the sensor and evaluate the level data signal to determine material level. An echo processing module periodically evaluates a digital representation of the analog signal to determine an expected window time and expected amplitude of a reflected echo representing the target of interest and developing the gate control signal based on expected window time and developing the select threshold level based on the expected amplitude.

Further features and advantages of the invention will be readily apparent from the specification and from the drawings.

DETAILED DESCRIPTION OF THE INVENTION

Figure 1:
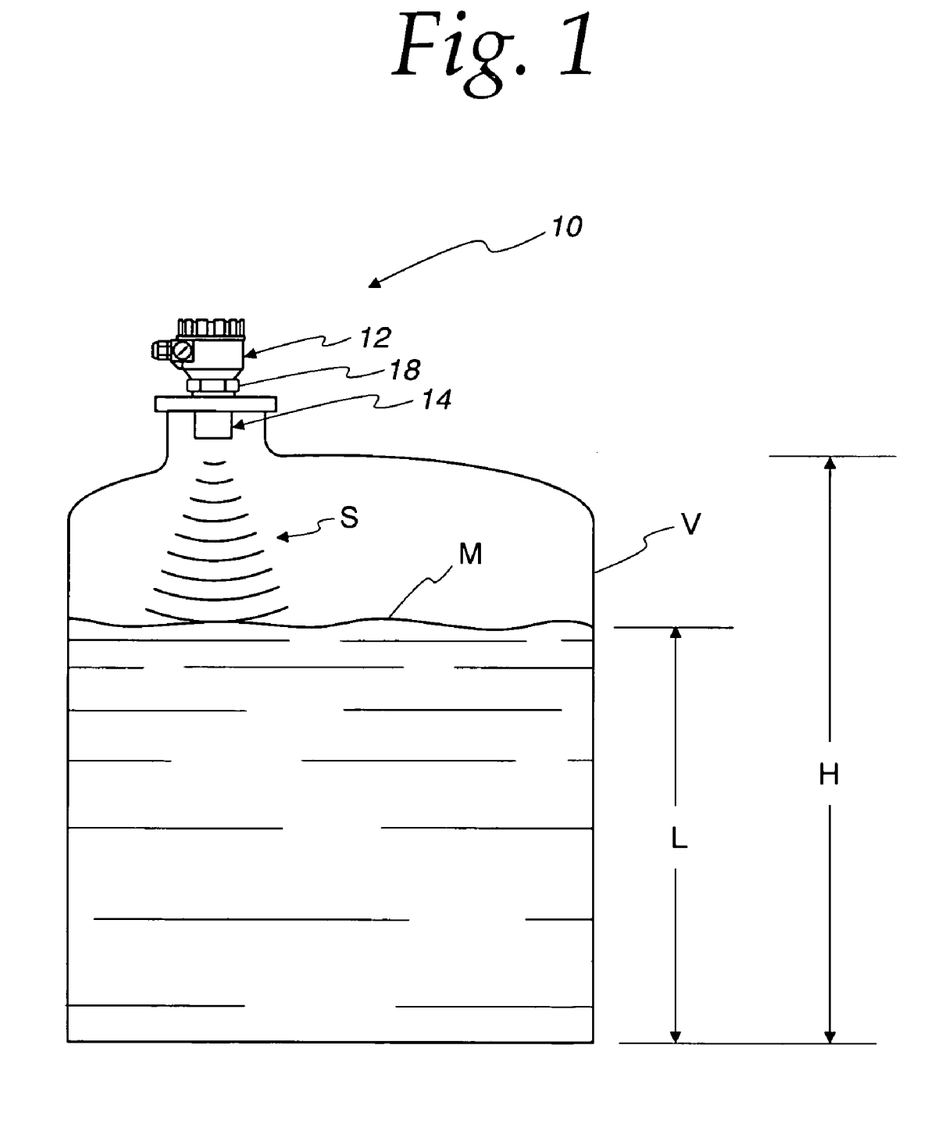
FIG. 1 is a side elevation view of a measurement instrument in accordance with the invention mounted in a process vessel.

Referring to FIG. 1, a process instrument 10 according to the invention is illustrated. The process control instrument 10 uses bursts of energy for measuring a level based on time required for reflected echoes to return from the material surface of interest. Particularly, the instrument 10 uses through air ultrasound for sensing level.

While the embodiments described herein relate to an ultrasonic level sensing apparatus, various aspects of the invention may be used with other types of process control instruments for measuring various process parameters, such as a distance or range finder, as will be apparent to those skilled in the art. Moreover, the instrument may use other forms of energy where the instrument measures time required for reflected echoes to return from the material surface of interest. Distance is derived from the propagation speed of the energy burst and the elapsed time of the echo travel for the echo returning from the target of interest. This distance can represent location of the material surface of interest, and thus can represent level by knowing the distance from the instrument relative to distance to the bottom of a vessel, or measuring flow when used in connection with a flume, as is known.

The instrument 10 includes a control housing 12 and a transducer 14 connected by a threaded fitting 18 for connection to a process vessel V having a height H. In accordance with the invention, a signal S in the form of bursts of energy is emitted from the transducer 14 and subsequently reflected from a surface of the material M. The distance is calculated by the equation $$D = (\text{velocity of } S \text{ propagation}) * \text{transit time(round trip)}/2.$$

Level L is then calculated by applying a tank height value, where L=H−D.

In accordance with the invention, the instrument 10 utilizes an improved measurement system design embodying a hybrid concept combining digital signal processing and analog hardware signal detection. The received analog signal generated from the emitted energy reflections, in the form of echoes, is used for the primary time of flight measurement. Derived envelope wave form data is acquired by the instrument's microprocessor and used to guide the measurement hardware. This system accomplishes accurate and robust measurement very efficiently.

Figure 2:
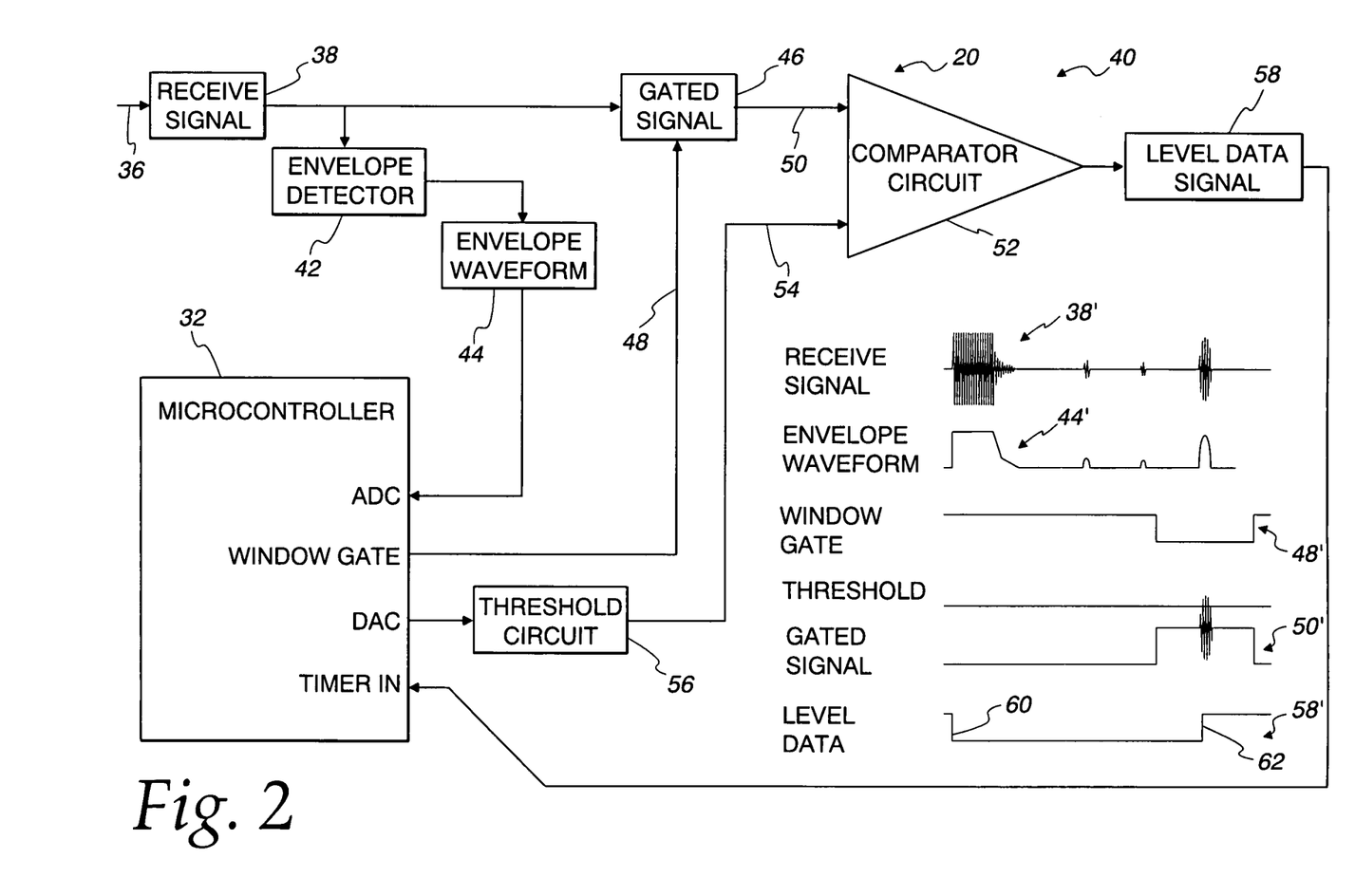
FIG. 2 is a partial block diagram of the instrument of FIG. 1.

Referring to FIG. 2, a block diagram of the measurement system 20 contained in the instrument control housing 12 is illustrated. This measurement system 20 is operatively connected to a sensor circuit 22, see FIG. 3, contained in the transducer 14.

Figure 3:
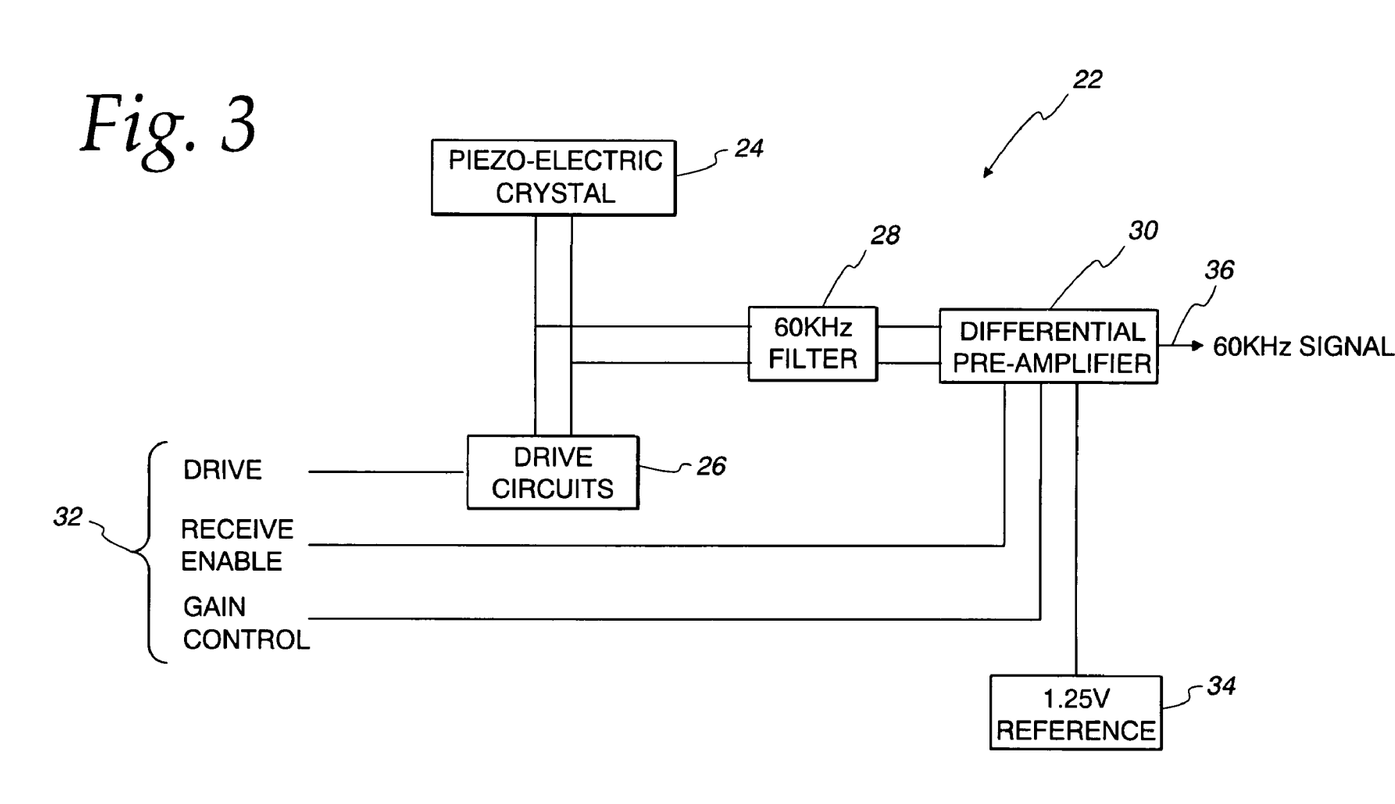
FIG. 3 is a block diagram of a sensor assembly of the instrument of FIG. 1.

The sensor circuit 22 include a piezo-electric crystal 24 connected to a drive circuit 26 and to a filter circuit 28. The filter circuit 28 is connected to a differential preamplifier 30. The drive circuit 26 receives a drive signal from a microcontroller 32, see FIG. 2, in the form of a 60 KHz pulse signal to drive the crystal 24. Likewise, the crystal 24 receives reflected echo pulses which are passed through the filter 28 to the preamplifier 30. The preamplifier 30 receives a reference from a reference circuit 34 and develops a 60 KHz signal comprising an analog signal representative of the reflected echoes, as is well known. The analog signal is supplied on a line 36 to a receive signal block 38 of the measurement system 20, see FIG. 2.

In the illustrated embodiment of the invention, the sensor circuit 22 includes a single crystal 24. As is known, the sensor circuit 22 could use separate transmit and receive crystals.

As described, the sensor circuit 22 comprises the drive circuit 26 transmitting a pulse signal via the crystal 24 at a target of interest and a receive circuit in the form of the crystal 24, filter 28 and preamplifier 30 receive reflected echoes of the pulse signal on the line 36 representative of the reflected echoes and develop the analog signal on the line 36.

Referring particularly to FIG. 2, the measurement system 20 comprises an analog processing circuit 40 and a programmed digital processing circuit in the form of the microcontroller 32. The analog processing circuit 40 is operatively coupled to the sensor circuit 22, see FIG. 3, by the receive signal block 38 receiving the analog signal from the line 36. The receive signal is illustrated by the exemplary curve 38'. An envelope detector 42 receives the analog receive signal from the receive signal block 38. The envelope detector 42 comprises a rectifier with low pass smoothing and develops an envelope wave form at a block 44. A representation of the envelope wave form, corresponding to the receive signal curve 38', is illustrated by a curve 44'. The envelope wave form is input to the microcontroller 32 using an analog to digital converter (ADC).

The analog signal from the receive signal block 38 is also supplied to a gate 46 which functions as an analog switch controlled by a window gate control signal on a line 48 from the microcontroller 48. The window gate control signal is illustrated by the curve 48'. Thus, the gate 46 develops a gated analog signal on a line 50 represented by a curve 50'. The gated analog signal comprises the portion of the receive signal when the window gate is driven low. The gated analog signal is supplied as one input to a comparator circuit 52. Another input of the comparator signal is a select threshold level signal on a line 54. The microcontroller 32 develops the select threshold level supplied via a digital analog converter (DAC) to a threshold circuit 56 operating as an interface to the comparator circuit 52. The comparator circuit 52 compares the gated analog signal to the select threshold level to develop a level data signal at a block 58 represented by a curve 58'. The level data signal is a discrete signal which goes from a high state to a low state, as at 60, representing transmission of a pulse, and goes high at a time 62 representing receipt of a target echo representing the target of interest. This is supplied to a "timer in" input of the microcontroller 32.

In the microcontroller 32, the time of flight measurement is made by a timer which counts clock ticks from a start pulse at 60 until the return echo is detected by the analog comparator circuit 52 which latches the level data signal 58 high when the echo signal has exceeded a threshold from the threshold circuit 56, stopping the timer at a time 62. The comparator circuit 52 is enabled only at a time of interest by the window gate control signal on the line 48 to prevent spurious comparator output. The window gate is set low prior to the approximate point in time of the target echo, determined using digital processing, as described below. Echo curve data is acquired by the microcontroller 32 represented by the envelope wave form 44. The data is accumulated as a running average of multiple acquired envelope signal traces to provide a more stable wave form. The averaged echo curve data is periodically searched for echo shapes resulting in a list of qualified echoes with their attributes such as approximate distance and amplitude. From this list, a target echo which is the echo considered to be the reflection from the surface of interest is selected.

Figure 4:
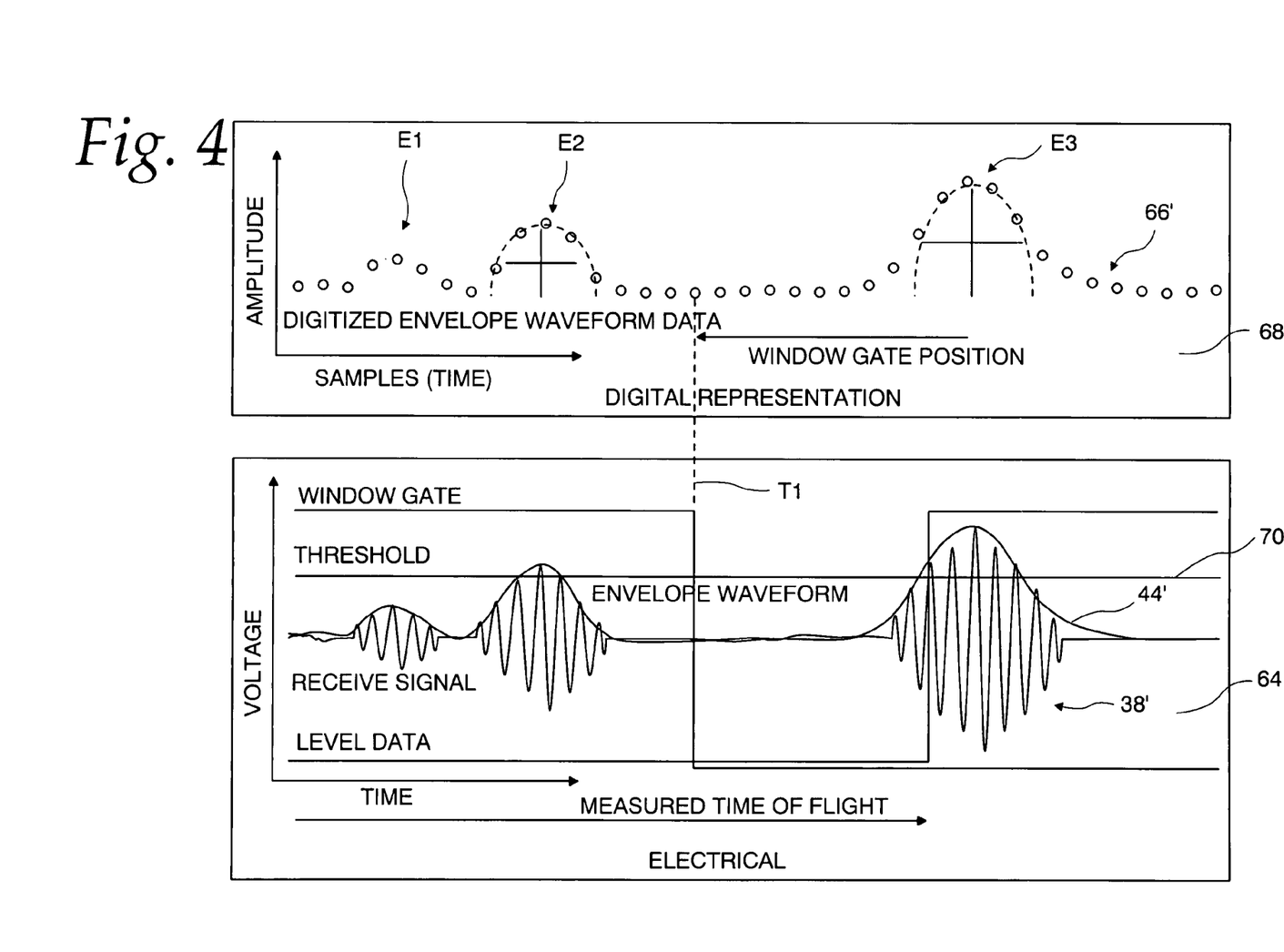
FIG. 4 is a set of curves illustrating analog and digital signals for the process instrument of FIG. 1.

FIG. 4 illustrates the measurement system 20 under typical operating conditions. A portion of the received signals and control outputs for a scan with target echo candidates is depicted. The start of the scan is not shown. The bottom block 64 illustrates the analog receive signal 38' with the corresponding envelope waveform 44'. The top block 68 comprises a digital representation 66' of the envelope waveform which is derived from the sampling implemented by the microcontroller 32. This example illustrates three echoes E1, E2 and E3 detected by the microcontroller 32. In this example, the rightmost echo E3 has been selected as the target echo by the digital echo processing functions. Consequently, the window gate is set low enabling the comparator circuit 52 prior to the point in time corresponding to that echo position. This is illustrated by the time T1 where the window gate goes from a high state to a low state. The threshold level on a line 70 is selected based on evaluated characteristics of the target echo. While the second echo E2 is above the threshold, it is effectively ignored as it precedes the gate time T1, as is apparent. On subsequent scans, the comparator circuit 52 latches the level data signal, capturing the time of flight, when the receive amplitude exceeds the threshold voltage signal level on the line 70.

In accordance with the invention, the microcontroller 32 is clocked to operate at two measurement cycles per second. Each cycle comprises data acquisition. After approximately four cycles, which may be selectable, the peak detection is performed to determine the gate control signal timing and the threshold level. Thus, these calculations are done at low resolution and infrequently in the microcontroller 32. The high resolution measurement is done in the analog circuitry which is more responsive to level changes. As such, the CPU can be run at a substantially lower clock rate which reduces power consumption proportionally.

Figure 5:
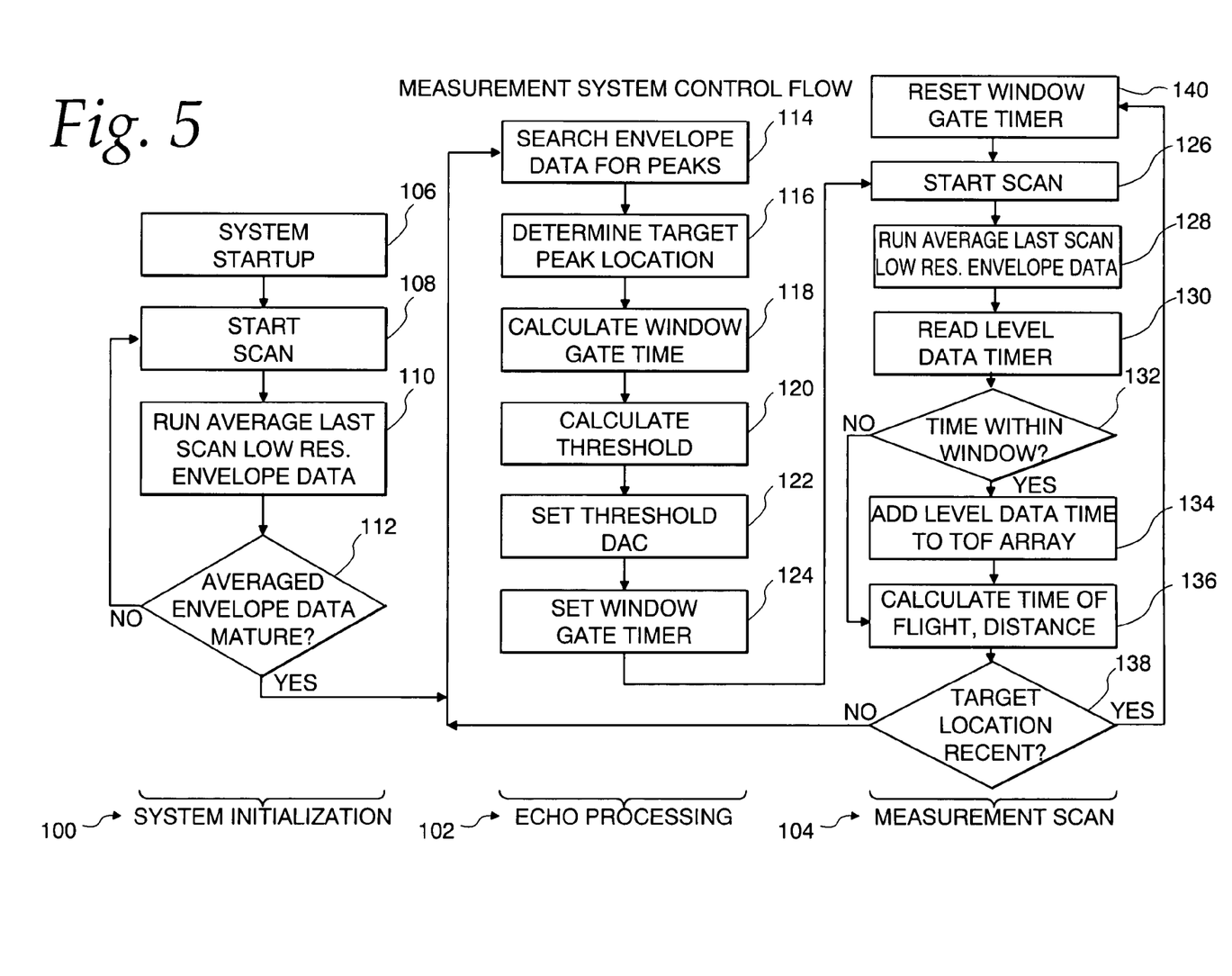
FIG. 5 is a diagram illustrating measurement system control flow implemented in the microcontroller of FIG. 2.

Referring to FIG. 5, a flow diagram illustrates the firmware implemented in the microcontroller 32 of FIG. 2. The flow diagram illustrates a system initialization module 100, an echo processing module 102 and a measurement module 104. The system initialization module 100 is only performed at power up and begins at a system start up node 106 followed by a start scan signal at a block 108. A block 110 runs a routine to obtain average, last scan and low resolution envelope data. A decision block 112 determines if the average envelope data is mature. If not, then control loops back to the block 108 until the average envelope data is mature at which time control advances to the echo processing module 102.

The echo processing module 102 begins at a block 114 which searches the envelope data 68, see FIG. 4, for peaks. A block 116 determines the target peak location. How the target peak location is selected can be based on user preference. A block 118 then calculates a window gate time in advance of the target peak location and a block 120 calculates the select threshold level. The threshold level is set to detect the echo of interest while ignoring spurious echoes. A block 122 sets the threshold DAC to the threshold circuit 56, while a block 124 sets the window gate timer. The microcontroller 32 thus uses the window gate timer to develop the gate control signal on the line 48 and the select threshold level signal on the line 54, discussed above. Thereafter, the control advances to the measurement scan module 104.

The measurement module 104 begins at a block 126 which starts a scan. A block 128 runs an envelope data routine, similar to that at the block 110, discussed above. A block 130 reads a level data timer based on the level data signal 58'. A decision block 132 determines if a time is within the window gate time. If so, then the level data is added to a time of flight array at a block 134. Thereafter, or if the time is not within the window, then a block 136 calculates the time of flight and converts this measurement to distance. A decision block 138 determines if the target location was updated recently. Particularly, the target location is reevaluated only periodically, such as every X scans to reduce processing requirements. If the target location is recent, then control moves to a block 140 to reset the window gate timer and begin another scan at the block 126. If the target location is not recent, then control performs the echo processing module 102 by advancing to the block 114, discussed above.

Thus, the microcontroller 32 implements the measurement module 104 every cycle, but the echo processing module 102 substantially less frequently. Thus, the measurement system continually conducts measurement scans with only occasional updates of the target location determined by the echo processing functions. Because the measurement scans take few CPU cycles and achieve high resolution measurements, the system is very efficient. The digital echo processing functions are computationally intense but conducted infrequently to obtain coarse target locations and improve overall measurement system robustness.

The present invention has been described with respect to flowcharts and block diagrams. It will be understood that each block of the flowchart and block diagrams can be implemented by computer program instructions. These program instructions may be provided to a processor to produce a machine, such that the instructions which execute on the processor create means for implementing the functions specified in the blocks. The computer program instructions may be executed by a processor to cause a series of operational steps to be performed by the processor to produce a computer implemented process such that the instructions which execute on the processor provide steps for implementing the functions specified in the blocks. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

Thus, in accordance with the invention, there is provided a hybrid concept combining digital signal processing and analog hardware signal detection.

We claim:

1. A hybrid measurement instrument comprising:
   a sensor circuit comprising a drive circuit for transmitting a pulse signal at a target of interest and a receive circuit receiving reflected echoes of the pulse signal and developing an analog signal representative of the reflected echoes;
   an analog processing circuit operatively coupled to the sensor circuit for receiving the analog signal and comprising a gate for selectively transferring the analog signal to a comparator that compares the gated analog signal to a select threshold level to develop a data signal representative of location of the target of interest; and
   a programmed digital processing circuit operatively coupled to the sensor circuit and the analog processing circuit, and comprising a measurement module to control the drive circuit and evaluate the data signal to determine material location, and an echo processing module to periodically evaluate a digital representation of the analog signal to determine an expected window time and expected amplitude of the reflected echo representing the target of interest and developing a gate control signal to control the gate based on the expected window time and developing the select threshold level based on the expected amplitude.

2. The hybrid measurement instrument of claim 1 wherein the sensor circuit comprises an ultrasonic transducer.

3. The hybrid measurement instrument of claim 1 wherein the sensor circuit comprises piezo-electric crystal.

4. The hybrid measurement instrument of claim 1 wherein the analog processing circuit comprises an envelope detector rectifying the analog signal transferred to the digital processing circuit.

5. The hybrid measurement instrument of claim 1 wherein the digital processing circuit echo processing module accumulates multiple digital representations of the analog signal as a running average.

6. The hybrid measurement instrument of claim 5 wherein the digital processing circuit echo processing module periodically searches the running average to determine location of echo shapes.

7. The hybrid measurement instrument of claim 6 wherein the digital processing circuit echo processing module periodically evaluates the echo shapes to determine a target echo and selecting the expected window time and the expected amplitude responsive to the target echo.

8. The hybrid measurement instrument of claim 1 wherein the comparator latches the data signal when the gated analog signal exceed the select threshold.

9. A through air level measurement instrument comprising:
   a sensor comprising a transducer for transmitting a pulse signal at a target of interest and receiving reflected echoes of the pulse signal and developing an analog signal representative of the reflected echoes;
   an analog processing circuit operatively coupled to the sensor for receiving the analog signal and comprising a gate for selectively transferring the analog signal to a comparator that compares the gated analog signal to a select threshold level to develop a level data signal representative of level of the target of interest; and
   a programmed digital processing circuit operatively coupled to the sensor and the analog processing circuit, and comprising a measurement module to control the drive circuit and evaluate the level data signal to determine material level, and an echo processing module to periodically evaluate a digital representation of the analog signal to determine an expected window time and expected amplitude of the reflected echo representing the target of interest and developing a gate control signal to control the gate based on the expected window time and developing the select threshold level based on the expected amplitude.

10. The through air level measurement instrument of claim 9 wherein the sensor comprises an ultrasonic transducer.

11. The through air level measurement instrument of claim 9 wherein the sensor comprises a piezo-electric crystal.

12. The through air level measurement instrument of claim 9 wherein the analog processing circuit comprises an envelope detector rectifying the analog signal transferred to the digital processing circuit.

13. The through air level measurement instrument of claim 9 wherein the digital processing circuit echo processing module accumulates multiple digital representations of the analog signal as a running average.

14. The through air level measurement instrument of claim 13 wherein the digital processing circuit echo processing module periodically searches the running average to determine location of echo shapes.

15. The through air level measurement instrument of claim 14 wherein the digital processing circuit echo processing module periodically evaluates the echo shapes to determine a target echo and selecting the expected window time and the expected amplitude responsive to the target echo.

16. The through air level measurement instrument of claim 9 wherein the comparator latches the level data signal when the gated analog; signal exceed the select threshold.

17. A through air level measurement instrument comprising:
   a sensor comprising a transducer for transmitting a pulse signal at a target of interest and receiving reflected echoes of the pulse signal and developing an analog signal representative of the reflected echoes;
   an analog processing circuit operatively coupled to the sensor for receiving the analog signal and comprising a gate for selectively transferring the analog signal to a comparator responsive to a gate control signal, the comparator comparing the gated analog signal to a select threshold level signal to develop a level data signal representative of level of the target of interest; and
   a programmed processor operatively coupled to the sensor and the analog processing circuit to receive the analog signal and the level data signal and to develop the gate control signal and the select threshold level signal, and comprising a measurement module to control the sensor and evaluate the level data signal to determine material level, and an echo processing module to periodically evaluate a digital representation of the analog signal to determine an expected window time and expected amplitude of the reflected echo representing the target of interest and developing the gate control signal based on the expected window time and developing the select threshold level based on the expected amplitude.

18. The through air level measurement instrument of claim 17 wherein the analog processing circuit comprises an envelope detector rectifying the analog signal transferred to the programmed processor.

19. The through air level measurement instrument of claim 17 wherein the echo processing module accumulates multiple digital representations of the analog signal as a running average.

20. The through air level measurement instrument of claim 19 wherein the echo processing module periodically searches the running average to determine location of echo shapes.

21. The through air level measurement instrument of claim 20 wherein the echo processing module periodically evaluates the echo shapes to determine a target echo and selecting the expected window time and the expected amplitude responsive to the target echo.

* * * * *